Jan. 12, 1937.  R. HAFNER  2,067,634
AIRCRAFT TAILPLANE
Filed July 27, 1935  2 Sheets-Sheet 1
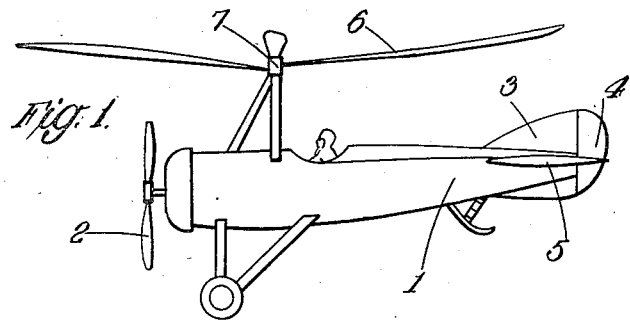
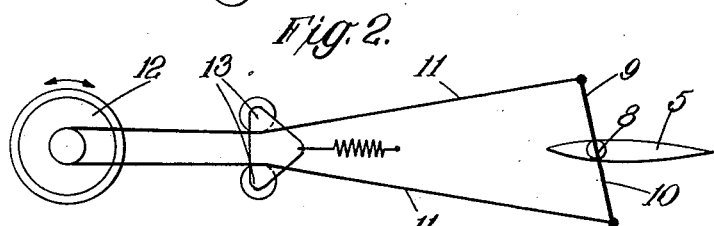
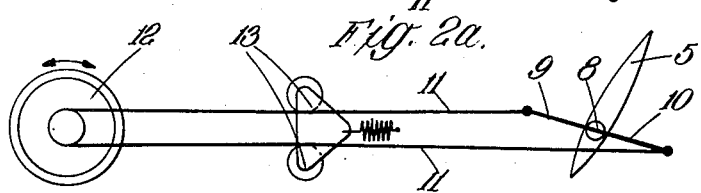
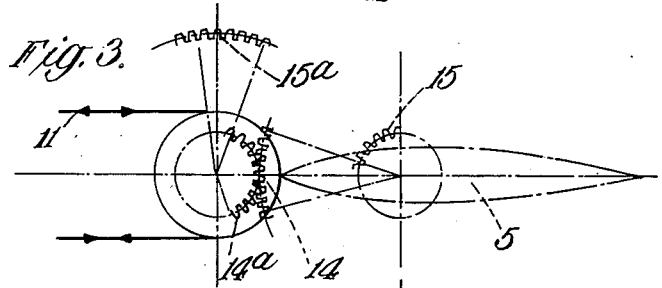
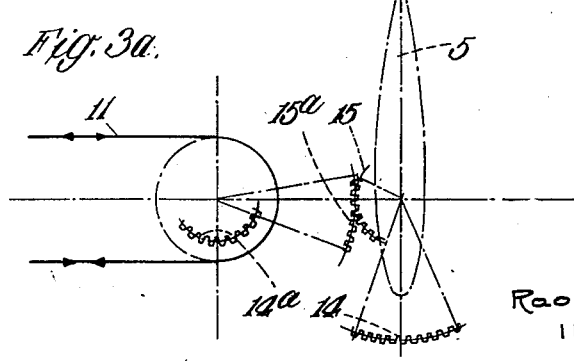
Raoul Hafner
INVENTOR
his ATTY.

Jan. 12, 1937.　　　　R. HAFNER　　　　2,067,634
AIRCRAFT TAILPLANE
Filed July 27, 1935　　　2 Sheets-Sheet 2
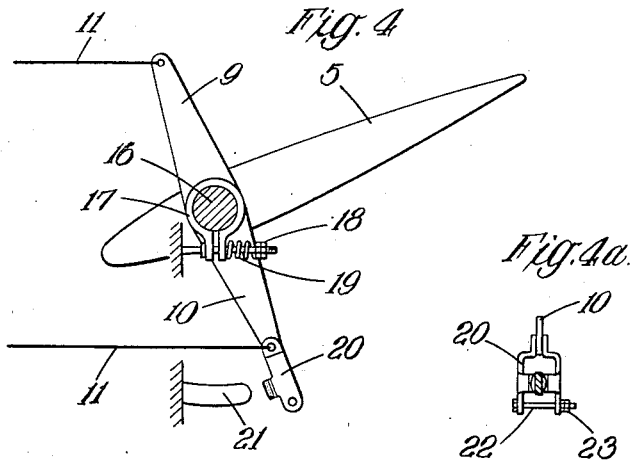
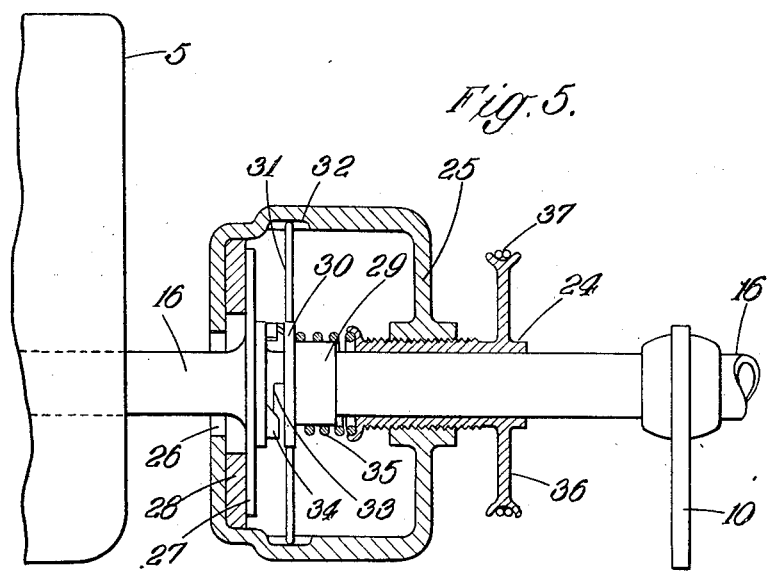
Raoul Hafner
INVENTOR
By Otto Munk
his ATT'Y.

Patented Jan. 12, 1937

2,067,634

UNITED STATES PATENT OFFICE 2,067,634

AIRCRAFT TAILPLANE

Raoul Hafner, Vienna, Austria

Application July 27, 1935, Serial No. 33,466
In Great Britain December 12, 1934

5 Claims. (Cl. 244—83)

This invention relates to aircraft capable of horizontal flight and descent at large angles of incidence, and has particular reference to what are known as rotating wing aircraft, in which such capabilities are marked.

It has been observed that when, for example, such aircraft are descending at high angles of incidence there is a considerable degree of instability of the tail, more particularly in that the tail tends to lift, depressing the nose of the aircraft, and to oscillate laterally or yaw. Such behaviour of the aircraft, which causes awkwardness or even damage in landing, is due to the fact that the tailplane, consisting of one or more approximately horizontal surfaces, is in a stalled condition when descending at abnormally high angles of incidence and tends to float downwards in a series of lateral swings in the manner of a falling leaf.

With the principal object of avoiding this disadvantage in aircraft of the kind in question the tailplane, according to the present invention, is rockable about a substantially horizontal transverse axis to such an extent that it may always be brought into substantial alignment with the air flow relative thereto.

Such a rockable tailplane may be operatively connected to a control device at the pilot's hand in such a way that, for a given movement of the control device, the rocking movement of the tailplane is greater at large angles to the horizontal than at small angles. This enables a fine adjustment to be made to the tailplane over a small angle about the horizontal for trimming the aircraft during normal cruising or fast flight, but nevertheless allows the tailplane to be rapidly brought to a high angle to the horizontal when a steep descent is begun.

Preferably the tailplane comprises one or more aerofoils each rockably mounted about an axis forward of its centre of pressure at high angles of incidence so that, neglecting other factors, it tends to move to small angles of incidence in the manner of a weathercock, and in this arrangement the said rocking axis may also be substantially coincident with the centre of pressure of the aerofoil at low angles of incidence for lightness of control over the normal trimming range. Such an arrangement may be adapted, as in a construction hereinafter described to ensure that if forward flight is suddenly for any reason, resumed during a steep descent of the aircraft, the tailplane will automatically return to the substantially horizontal trimming position, but will not thereafter be movable except by actuation of the control device. To this end the rocking motion of the aerofoil may be subject to a frictional, hydraulic or equivalent restraint which is sufficiently large, at small angles to the horizontal, to prevent it from being deflected except by moving the actuating means, but which is diminished at large angles to the horizontal to such an extent that the aerofoil may be deflected to a low angle by a substantial change in its angle of incidence, for example by the airscrew slipstream if the throttle is opened during a steep descent.

The following description and accompanying drawings refer, for the sake of example only, to a few of the many practical forms which the invention may take.

In the drawings:—

Figure 1 is a general side elevation of an aircraft of the auto-rotative wing or windmill type.

Figure 2 and 2a are diagrammatic views of one form of operative connection between the tailplane and a control member, showing two different positions thereof.

Figures 3 and 3a are views corresponding to Figures 2 and 2a, but with reference to an alternative form of connection.

Figure 4 is a side view of the tailplane, showing one form of means for varying the frictional restraint thereon in accordance with its displacement.

Figure 4a is an end view of a detail feature of Figure 4, and

Figure 5 is a section, transversely of the aircraft of alternative means for varying the frictional restraint on the tailplane.

As shown in Figure 1 the aircraft comprises a fuselage 1 forwardly driven by an airscrew 2 and having at its tail a vertical fin 3 and rudder 4 for directional stabilizing and control respectively and a generally horizontal aerofoil-section tailplane 5 to give fore-and-aft stability against pitching. The aircraft is supported during flight by the wing elements 6, which are rotated about a hub 7 by the slipstream past the aircraft.

As and for reasons previously explained, the tailplane 5 of such aircraft is, according to the invention, rockable about a substantially horizontal transverse axis to such an extent that it may always be brought into substantial alignment with the airflow relative thereto, which during steep descents may be almost at right angles to the longitudinal axis of the fuselage.

Figures 2 and 2a show an arrangement whereby this may be done, the tailplane 5 being pivoted at 8 to the fuselage and having lever arms 9 and 10 projecting above and below it, the ends of the latter being connected by a cable 11 to a control wheel 12. The cable 11 is preferably kept taut by spring-loaded jockey pulleys 13 as shown, and it will be observed that rotation of the control wheel 12 will deflect the tailplane 5 to any extent down to the substantially vertical position.

Now slight departures of the tailplane from the horizontal are used in practice to trim the aircraft during level flight at cruising speeds, for example in accordance with the distribution of the load carried, and the adjustment over this range is fairly critical owing to the speed of the aircraft, whereas for slow descents at steep angles it is of more importance to ensure that the tailplane may be brought to the necessary coarse angle as quickly as possible than to provide a fine adjustment at such angles.

With these desiderata in view and in accordance with a further feature of the invention previously referred to, the connection between the tailplane 5 and the control wheel 12 in Figures 2 and 2a is such that, owing to the increasing obliquity of the lever arms 9 and 10 the rocking movement of the tailplane is greater at large angles to the horizontal than at small for a given angular shift of the control wheel, thereby achieving the object in view.

Alternative means for attaining this result are shown in Figures 3 and 3a, and comprise two sets of mutilated gears 14, 14a and 15, 15a inserted in the connection beween the tailplane and the control wheel, gears 14, 14a providing a low ratio for fine adjustment at small angles below the horizontal (Figure 3) and gears 15, 15a providing immediately thereafter a high ratio for rapid adjustment at coarser angles (Figure 3a).

In order that the tailplane shall remain at its approximately horizontal trimming setting during cruising, its rocking axis is arranged to be substantially coincident with a line passing through the centres of pressure of its aerofoil sections, so that the relative airflow can exert no appreciable turning moment thereon under these conditions. Additionally a considerable frictional restraint is introduced into the operating system to ensure that the angle of the tailplane over this range cannot be altered except at the will of the pilot by movement of the control wheel 12.

If, however, the aircraft is descending at a steep angle with the tailplane suitably aligned and a horizontal blast of air is directed on the latter, it is at once operating at a high negative angle of incidence. Under these conditions the centre of pressure of the tailplane moves rearwardly of its rocking axis and it tends to "weathercock", that is to say to move automatically back towards the horizontal position in alignment with the air stream.

Advantage is therefore taken of this tendency to ensure that the cruising position of the tailplane is automatically resumed if, for example, the pilot decides at the last moment not to land and opens the throttle to resume forward flight or to climb again, the sudden slip-stream from the propeller providing the horizontal air blast referred to.

The frictional restraint on the tailplane is accordingly automatically reduced, at large angles below the horizonal, to allow the "weathercock" action in question to take place, and Figures 4 and 4a of the drawings show diagrammatically a simple form of construction for obtaining this result.

As shown therein, the tailplane 5 is fast to a rock shaft 16 journalled in the fuselage, this shaft being encircled by a stationary frictional strap or split collar 17 adapted to be tightened or loosened thereon by means of a nut 18 acting through a spring 19 as shown, in order to arrive at the optimum value of the minimum or constant frictional restraint to which the shaft 16 is subject at all angles. This value will be such that at large angles to the horizontal the tailplane will be sufficiently restrained to enable it to exert a stabilizing action on the aircraft during slow steep descents, but will be free to "weathercock" under the influence of the horizontal propeller slipstream if the throttle is opened. As, however, the tailplane approaches or is moved by the pilot towards the horizontal position, a clip device 20 carried by the lever arm 10 thereof comes into sliding frictional engagement with a stationary bar 21. Additional friction is thereby introduced which is sufficient, in conjunction with the constant friction of the strap 17 and the return of the centre of air pressure to the axis of the rock shaft 16, to prevent the tailplane being moved at this and smaller angles from the horizontal except by movement of the control wheel 12. This additional friction may also be adjusted to the optimum value by means of a bolt 22 and nut 23 joining the wings of the clip 20, as shown in Figure 4a.

Figure 5 shows an alternative construction for the purpose under discussion, in which an externally screw threaded sleeve 24 is slidably and rotatably carried by the shaft 16 intermediately between one tailplane 5 and the lever arm 10. The screw thread on this sleeve engages in an internally screw threaded central aperture in one end of a generally cylindrical drum 25 coaxial with the shaft 16 having an enlarged aperture 26 at its other end to accommodate the shaft. The drum 25 is stationary, being fixed to the fuselage of the aircraft.

The shaft 16 has formed thereon, within the drum 25, a circular flange or disc 27 parallel and adjacent to the end of the drum having the aperture 26, a flat ring 28 of friction material being interposed between them. Slidably mounted on the shaft 16 further within the drum 25 is a collar 29 having a flange 30 facing the flange 27. The collar 29 and flange 30 are prevented from rotating relatively to the drum 25, as by radial extensions 31 thereof engaging at their outer ends in longitudinal grooves 32 in the inner cylindrical wall of the drum, and the opposed faces of the flanges 27 and 30 bear interengaging pairs of inclined cam projections 33, 34. Finally a compressed coil spring 35 is interposed between the back of the flange 30 and the inner end of the intermediate sleeve 24 and it will be apparent that, owing to the relation between the cam projections 33, 34, on rotating the shaft 16 in one direction the flanges will separate, increasing the compression of the spring 35 and compressing the friction ring 28 more firmly between the drum 25 and the shaft 16, and that on rotating the shaft in the opposite direction the reverse will occur. It will therefore readily be understood that by suitably shaping and disposing the cam projections 33, 34 the frictional restraint on the flange 27 may be automatically changed from a maximum when the tailplane is approximately horizontal to a minimum when it is at large angles thereto. This minimum is determined by the initial compression in the spring 35, and can therefore be varied by screwing the intermediate sleeve 24 into or out of the drum 25 in order to find the optimum value at which the tailplane, during steep descents, will be held sufficiently firmly for it to exert a stabilizing effect, but will readily "weathercock" to the horizontal position as desired if forward flight is resumed. For this purpose the sleeve 24 bears externally a grooved flange or pulley 36 round which passes a cable 37 connected to a control at the pilot's hand.

What I claim and desire to secure by Letters Patent of the United States is:—

1. In a rotary wing or other aircraft capable of entering steep descents without substantial changes in its attitude, the combination of a generally horizontal stabilizing tailplane rockable about an axis transverse of the aircraft, means operable by the pilot to adjust said tailplane into substantial alignment with the relative air flow at all times, and means applying to said tailplane a restraint against loss of adjustment which is diminished in value when said tailplane is aligned with the upward air flow during a steep descent.

2. In a rotary wing or other aircraft capable of entering steep descents without substantial changes in its attitude, the combination of a generally horizontal stabilizing tailplane rockable about an axis transverse of the aircraft, means operable by the pilot to adjust said tailplane into substantial alignment with the relative air flow at all times, and friction means applying to said tailplane a restraint against loss of adjustment which is diminished in value when said tailplane is aligned with the upward air flow during a steep descent.

3. In a rotary wing or other aircraft capable of entering steep descents without substantial changes in its attitude, the combination of a generally horizontal stabilizing aerofoil tailplane rockable about an axis transverse of the aircraft and adjacent to the centre of pressure line of said tailplane at small angles of incidence, means operable by the pilot to adjust said tailplane into substantial alignment with the relative air flow at all times, and means applying to said tailplane a restraint against loss of adjustment which is diminished in value when said tailplane is aligned with the upward air flow during a steep descent.

4. In a rotary wing or other aircraft capable of entering steep descents without substantial changes in its attitude, the combination of a generally horizontal stabilizing aerofoil tailplane rockable about an axis transverse of the aircraft and adjacent to the centre of pressure line of said tailplane at small angles of incidence, means operable by the pilot to adjust said tailplane into substantial alignment with the relative air flow at all times, and friction means applying to said tailplane a restraint against loss of adjustment which is diminished in value when said tailplane is aligned with the upward air flow during a steep descent.

5. In a rotary wing or other aircraft capable of entering steep descents without substantial changes in its attitude, the combination of a generally horizontal stabilizing tailplane rockable about an axis transverse of the aircraft, means operable by the pilot and whose mechanical advantage is reduced at large displacements to adjust said tailplane into substantial alignment with the relative air flow at all times, and means applying to said tailplane a restraint against loss of adjustment which is diminished in value when said tailplane is aligned with the upward air flow during a steep descent.

RAOUL HAFNER.